US012626842B2

(12) United States Patent
Oyewole et al.

(10) Patent No.: US 12,626,842 B2
(45) Date of Patent: May 12, 2026

(54) METAL OXIDE-POLYANILINE POLYMER MATRIX VARISTOR

(71) Applicant: Littelfuse, Inc., Chicago, IL (US)

(72) Inventors: Oluwaseun Kehinde Oyewole, Chicago, IL (US); Marco Doms, Chicago, IL (US)

(73) Assignee: Littelfuse, Inc., Rosemont, IL (US)

( * ) Notice: Subject to any disclaimer, the term of this patent is extended or adjusted under 35 U.S.C. 154(b) by 435 days.

(21) Appl. No.: 18/232,172

(22) Filed: Aug. 9, 2023

(65) Prior Publication Data

US 2025/0054663 A1 Feb. 13, 2025

(51) Int. Cl.

| | |
|---|---|
| ***H01C 7/112*** | (2006.01) |
| ***H01C 1/034*** | (2006.01) |
| ***H01C 1/142*** | (2006.01) |
| ***H01C 7/10*** | (2006.01) |
| ***H01C 17/00*** | (2006.01) |
| ***H01C 17/065*** | (2006.01) |
| ***H01C 17/28*** | (2006.01) |

(52) U.S. Cl.

CPC ............. *H01C 7/112* (2013.01); *H01C 1/034* (2013.01); *H01C 1/142* (2013.01); *H01C 7/1006* (2013.01); *H01C 17/006* (2013.01); *H01C 17/06546* (2013.01); *H01C 17/28* (2013.01)

(58) Field of Classification Search

CPC ........ H01C 7/112; H01C 1/034; H01C 1/142; H01C 7/1006; H01C 17/006; H01C 17/06546; H01C 17/28

See application file for complete search history.

(56) References Cited

U.S. PATENT DOCUMENTS

| | | | | |
|---|---|---|---|---|
| 4,103,274 A * | 7/1978 | Burgess | H01C 7/112 | 338/21 |
| 4,364,021 A * | 12/1982 | Levinson | H01C 7/102 | 338/20 |
| 4,377,541 A * | 3/1983 | Bobik | B22F 5/10 | 338/21 |
| 4,538,347 A * | 9/1985 | Palilla | H01C 7/102 | 216/101 |
| 5,781,394 A * | 7/1998 | Lorenz | H01C 7/10 | 338/21 |
| 5,783,111 A * | 7/1998 | Ikkala | C08G 73/0266 | 252/500 |
| 2011/0058291 A1* | 3/2011 | Kosowsky | H01C 7/10 | 361/728 |
| 2022/0065707 A1* | 3/2022 | Hayasaka | H01C 1/1413 | |

FOREIGN PATENT DOCUMENTS

JP 2022131901 * 9/2022

OTHER PUBLICATIONS

JP-2022131901 machine translation. (Year: 2022).*

* cited by examiner

*Primary Examiner* — Kyung S Lee
(74) *Attorney, Agent, or Firm* — KDW Firm PLLC

(57) ABSTRACT

A method of manufacturing a metal oxide varistor (MOV), the method including placing a quantity of a MOV composition in a pressing die, the MOV composition including metal oxide granules mixed with a polyaniline-polymer, performing a pressing operation including operating the pressing die to compress the MOV composition into a solid MOV chip, and applying first and second electrodes to opposing first and second sides of the MOV chip, wherein the pressing operation is performed at a temperature in a range of 15 degrees Celsius to 200 degrees Celsius.

9 Claims, 4 Drawing Sheets

METAL OXIDE-POLYANILINE POLYMER MATRIX VARISTOR

BACKGROUND

Field

The present disclosure relates generally to the field of circuit protection devices. More specifically, the present disclosure relates to a metal oxide varistor that can be produced using a low temperature process and that is resistant to thermal shock.

Description of Related Art

Metal oxide varistors (MOVs) are voltage dependent, nonlinear devices that provide transient voltage suppression in electronic circuits. A MOV has high electrical resistance when subjected to a low voltage and a low electrical resistance when subjected to a high voltage. When connected in parallel with a protected circuit component, a MOV can clamp voltage to a safe level in the event of a high transient voltage in the circuit. The MOV thus absorbs energy that could otherwise damage the protected component.

A conventional MOV chip is made from a composition of metal oxide granules embedded in a ceramic matrix. A shortcoming associated with such MOV compositions is that they must be subjected to a sintering process performed at very high temperatures to form a chip. Additionally, the ceramic matrix is brittle and is prone to cracking if subjected to thermal shock, which can occur during an abnormal overvoltage event. This can lead to excessive heating and combustion.

It would be desirable to provide a MOV chip that can be manufactured using low temperature (e.g., room temperature) processes. It would also be desirable to provide a MOV chip that is resistant to thermal shock.

It is with respect to these and other considerations that the present improvements may be useful.

SUMMARY

This Summary is provided to introduce a selection of concepts in a simplified form further described below in the Detailed Description. This Summary is not intended to identify key features or essential features of the claimed subject matter, nor is the summary intended as an aid in determining the scope of the claimed subject matter.

A metal oxide varistor (MOV) in accordance with an embodiment of the present disclosure includes a MOV chip, a first electrode disposed on a first side of the MOV chip, and a second electrode disposed on a second side of the MOV chip, wherein the MOV chip is formed of a MOV composition comprising metal oxide granules embedded in a polyaniline-polymer matrix.

A method of manufacturing a metal oxide varistor (MOV) in accordance with an embodiment of the present disclosure includes placing a quantity of a MOV composition in a pressing die, the MOV composition including metal oxide granules mixed with a polyaniline-polymer, performing a pressing operation including operating the pressing die to compress the MOV composition into a solid MOV chip, and applying first and second electrodes to opposing first and second sides of the MOV chip, wherein the pressing operation is performed at a temperature in a range of 15 degrees Celsius to 200 degrees Celsius.

BRIEF DESCRIPTION OF THE DRAWINGS

By way of example, various embodiments of the present disclosure will now be described, with reference to the accompanying drawings, wherein.

DETAILED DESCRIPTION

Figure 1A:
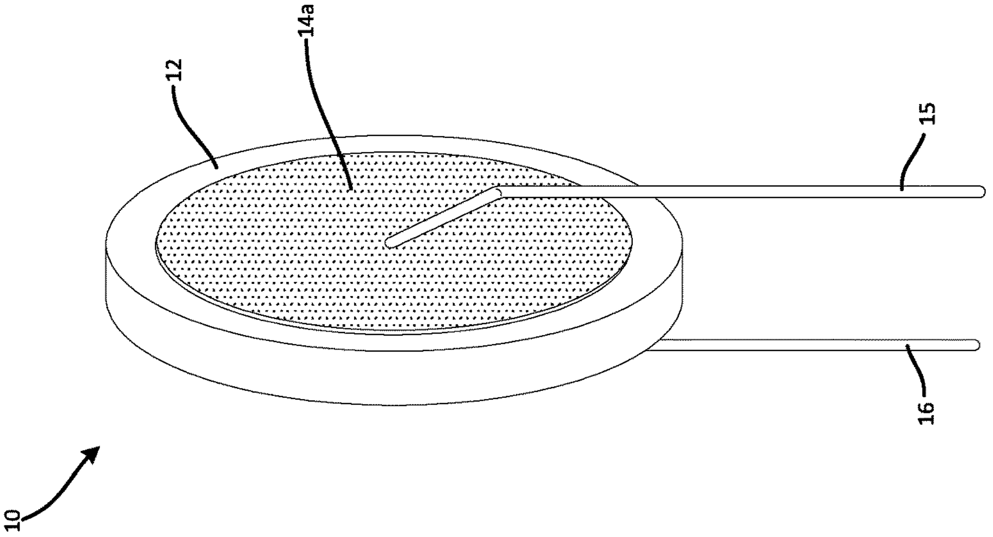
FIG. 1A is a front perspective view illustrating a MOV in accordance with an embodiment of the present disclosure.

As used herein, an element or operation recited in the singular and proceeded with the word “a” or “an” are understood as possibly including plural elements or operations, except as otherwise indicated. Furthermore, various embodiments herein have been described in the context of one or more elements or components. An element or component may comprise any structure arranged to perform certain operations. Although an embodiment may be described with a limited number of elements in a certain topology by way of example, the embodiment may include more or less elements in alternate topologies as desired for a given implementation. Note any reference to “one embodiment” or “an embodiment” means a particular feature, structure, or characteristic described in connection with the embodiment is included in at least one embodiment. The appearances of the phrases “in one embodiment,” “in some embodiments,” and “in various embodiments” in various places in the specification are not necessarily all referring to the same embodiment.

Embodiments of a metal oxide varistor (MOV) and a method of manufacturing the same in accordance with the present disclosure will now be described more fully with reference to the accompanying drawings, in which preferred embodiments of the present disclosure are presented. The MOV and the method of manufacture may, however, be embodied in many different forms and should not be construed as being limited to the embodiments set forth herein. Rather, these embodiments are provided so that this disclosure will convey certain aspects of the MOV and the method of manufacture to those skilled in the art. In the drawings, like numbers refer to like elements throughout unless otherwise noted.

Figure 1B:
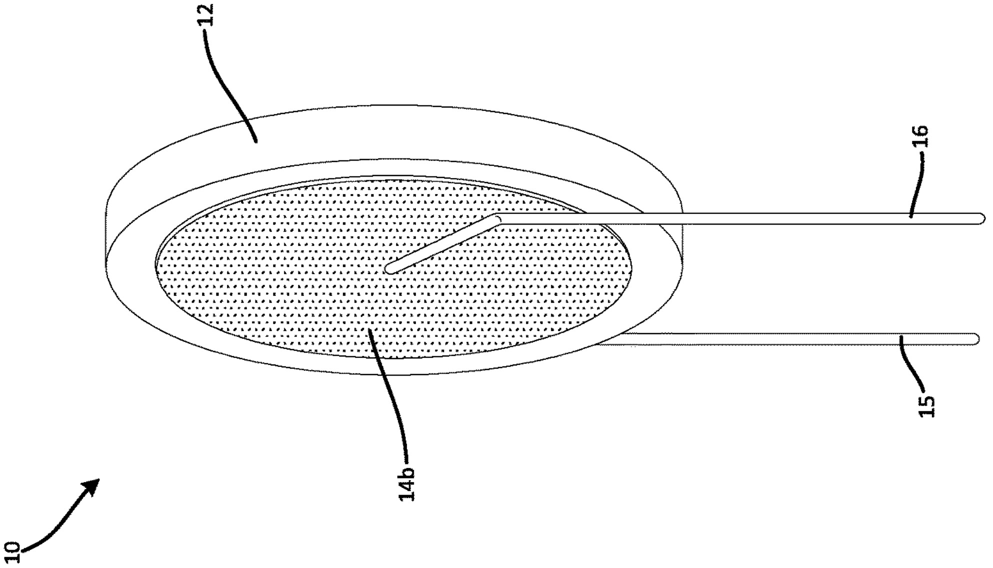
FIG. 1B is a rear perspective view illustrating the MOV of FIG. 1A.

Referring to FIGS. 1A and 1B, perspective front and rear views of a metal oxide varistor (MOV) 10 in accordance with the present disclosure are shown. For the sake of convenience and clarity, terms such as “front,” “rear,” “top,” “bottom,” “up,” “down,” “above,” “below,” etc. may be used herein to describe the relative placement and orientation of various components of the MOV 10, each with respect to the geometry and orientation of the MOV 10 as it appears in FIG. 1A. Said terminology will include the words specifically mentioned, derivatives thereof, and words of similar import.

Referring to FIGS. 1A and 1B, the MOV 10 may include a MOV chip 12 having substantially identical first and second electrodes 14*a*, 14*b* disposed on opposing front and rear sides thereof. The first and second electrodes 14*a*, 14*b* may be formed of any suitable, electrically conductive material, including, but not limited to, copper, copper alloy, aluminum, aluminum covered with copper, silver, tin, nickel, etc., and may be affixed to the MOV chip 12 by cold pressing, solder, electrically conductive adhesive, etc., or deposited on the MOV chip by sputtering. The present disclosure is not limited in this regard. The MOV chip 12 and the first and second electrodes 14*a*, 14*b* are depicted as being generally circular in shape, but this is not critical. It is contemplated that one or more of the MOV chip 12 and the first and second electrodes 14*a*, 14*b* may have a different shape, such as rectangular, triangular, irregular, etc. without departing from the scope of the present disclosure.

The MOV 10 may further include electrically conductive first and second leads 15, 16 connected to the first and second electrodes 14*a*, 14*b*, respectively, for facilitating electrical connection of the MOV 10 within a circuit. In various non-limiting embodiments, the first and second leads 15, 16 may be formed of copper, tin, silver, etc., and may be electrically connected to the first and second electrodes 14*a*, 14*b* via soldering, welding, electrically conductive adhesive, etc. The present disclosure is not limited in this regard.

Figure 1C:
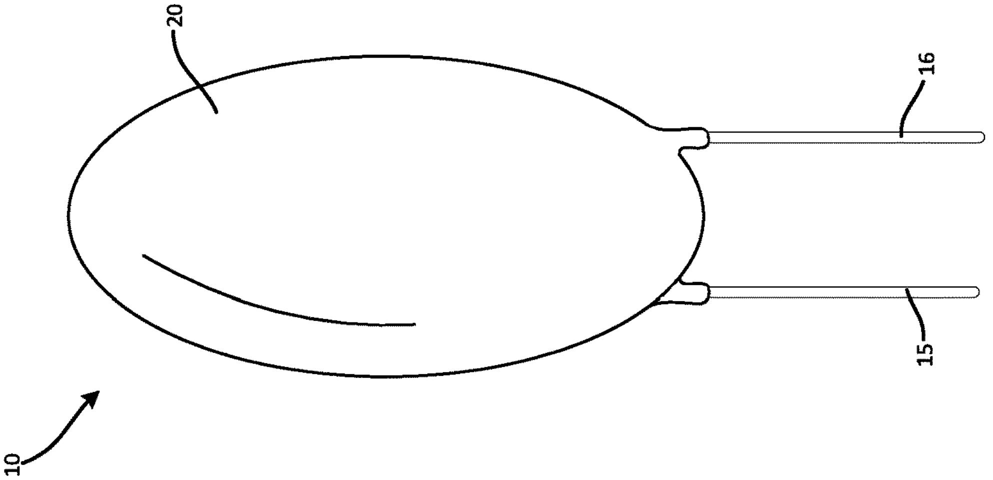
FIG. 1C is a rear perspective view illustrating the MOV of FIG. 1A with a polymer coating.

Referring to FIG. 1C, the MOV 10 may further include a dielectric polymer coating 20 that covers the MOV chip 12, the first and second electrodes 14*a*, 14*b*, and portions of the first and second leads 15, 16. The polymer coating 20 may protect the covered components of the MOV 10 from environmental elements and may prevent electrical shorting between the MOV 10 and surrounding circuit components.

The MOV chip 12 may be formed of a MOV composition that is adapted to resist thermal shock and that can be formed into a chip using low temperature processes as further described below. For example, the MOV composition may include metal oxide granules (e.g., zinc oxide granules) embedded in a polyaniline-polymer matrix. It has been found through testing that the polyaniline-polymer matrix of the present disclosure is far more robust and far less susceptible to cracking when subjected to abnormal overvoltage conditions relative to ceramic matrices used in conventional MOV chips. The risk of catastrophic failure (e.g., combustion) is therefore greatly mitigated relative to conventional MOV chips.

Referring to FIG. 2A-2F, a series of perspective view illustrating an exemplary method for manufacturing the above-described MOV 10 in accordance with the present disclosure is shown. The method will now be described in conjunction with the illustrations of the MOV 10 presented in FIGS. 1A-1C.

Figure 2B:
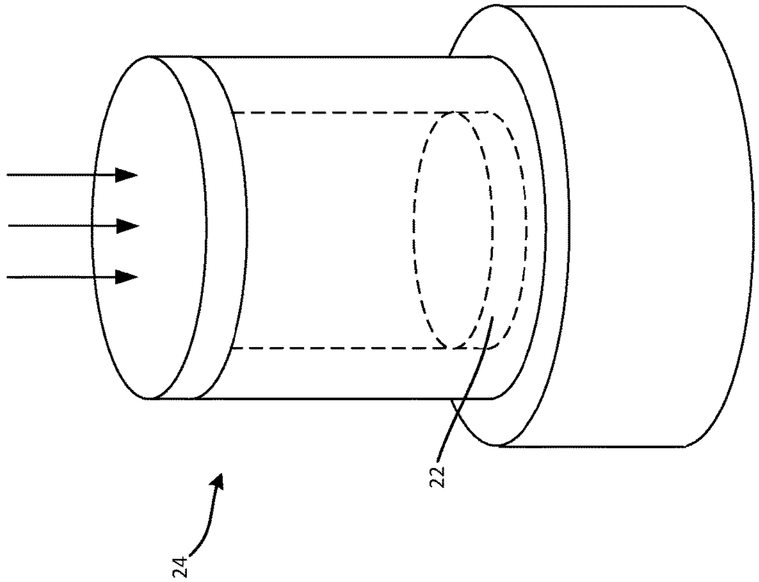
FIGS. 2A-2F are a series of perspective views illustrating a method of manufacturing a MOV in accordance with an embodiment of the present disclosure.
Figure 2A:
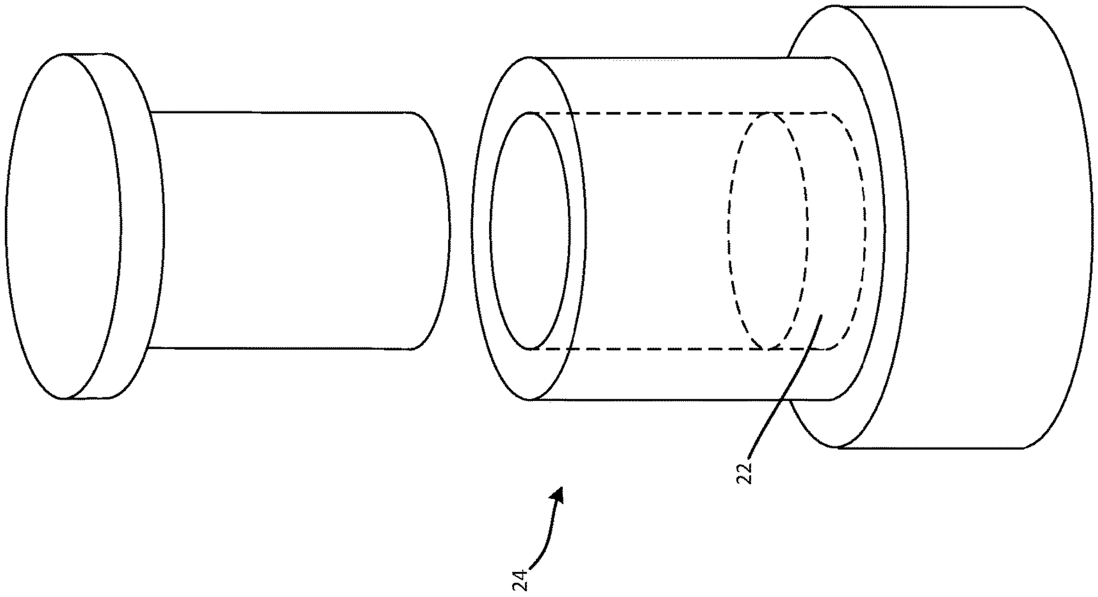

In FIG. 2A, a quantity of the above-described MOV composition (hereinafter "the MOV composition 22") may be placed in a pressing die 24. The MOV composition 22 may be a powder or granular mixture that includes metal oxide granules (e.g., zinc oxide granules) mixed with a polyaniline-polymer. In FIG. 2B, the pressing die 24 may be operated to compress the MOV composition 22 into a solid MOV chip 12. This process can be performed at relatively low temperatures (e.g., between 15 degrees Celsius and 200 degrees Celsius), and does not require high temperatures (e.g., 1500 degrees Celsius to 1700 degrees Celsius) typically associated with sintering processes that are used to form MOV chips from conventional MOV compositions (i.e., metal oxide granules embedded in a ceramic matrix). The thickness of the MOV chip 12 may be determined by the density and weight of the MOV composition 22 as well as the pressure applied by the pressing die 24. The robustness and breakdown voltage of the MOV chip 12 can be easily tuned by varying the ratio of metal oxide and polyaniline-polymer in the MOV composition 22.

Figure 2D:
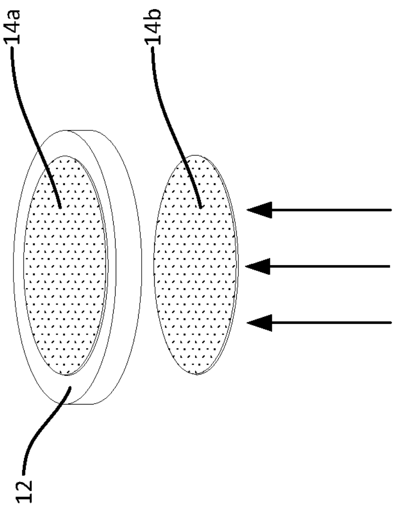
Figure 2C:
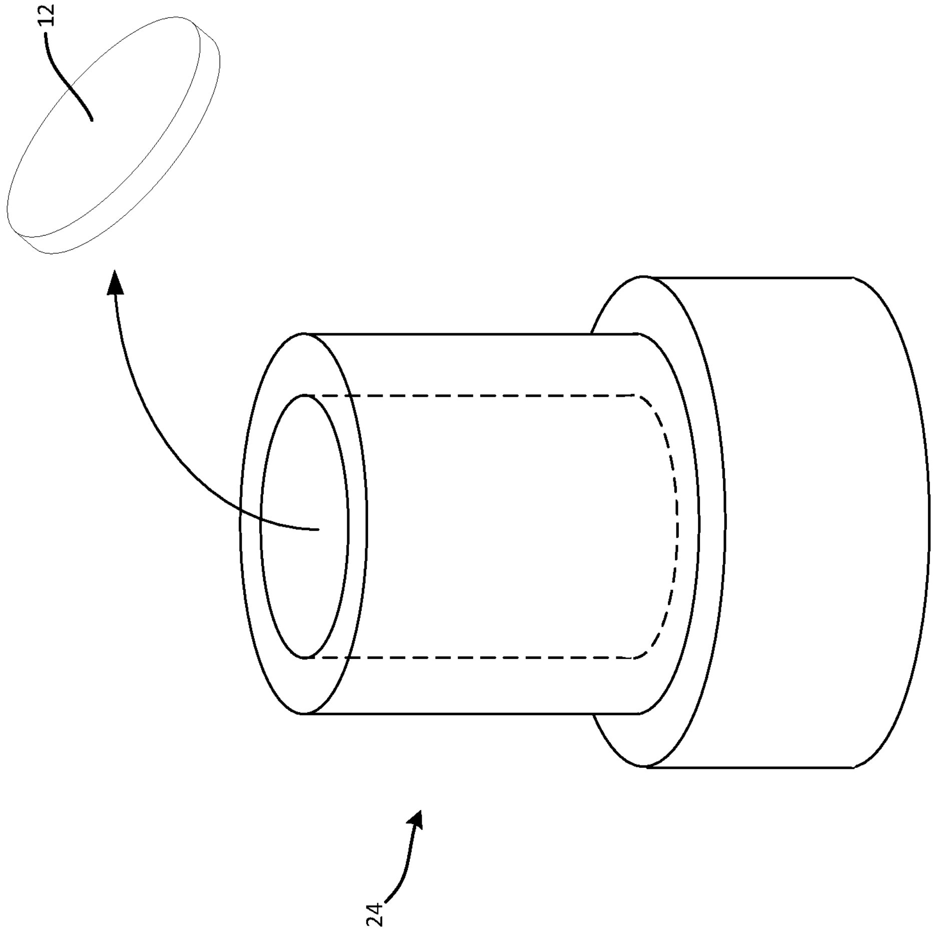

Referring to FIG. 2C, the MOV chip 12 may be removed from the pressing die 24 and, as shown in FIG. 2D, the first and second electrodes 14*a*, 14*b* may be applied to opposing front and rear sides of the MOV chip 12 (the first electrode 14*a* is shown applied to the front side of the MOV chip 12, and the second electrode 14*b* is shown in the process of being applied to the rear side of the MOV chip 12). In various embodiments, the first and second electrodes 14*a*, 14*b* may be applied to the opposing front and rear sides of the MOV chip 12 using a cold pressing process or a sputtering process, for example. The present disclosure is not limited in this regard.

Figure 2F:
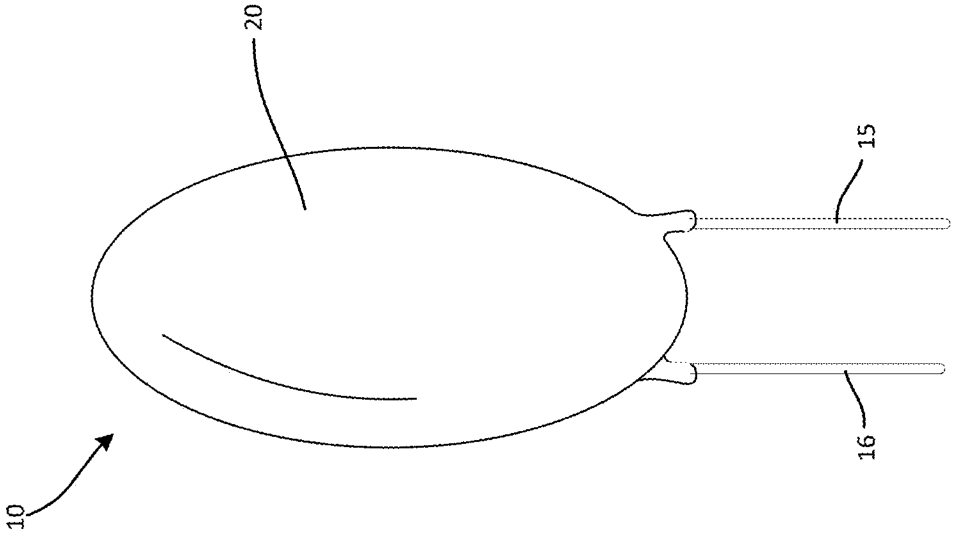
Figure 2E:
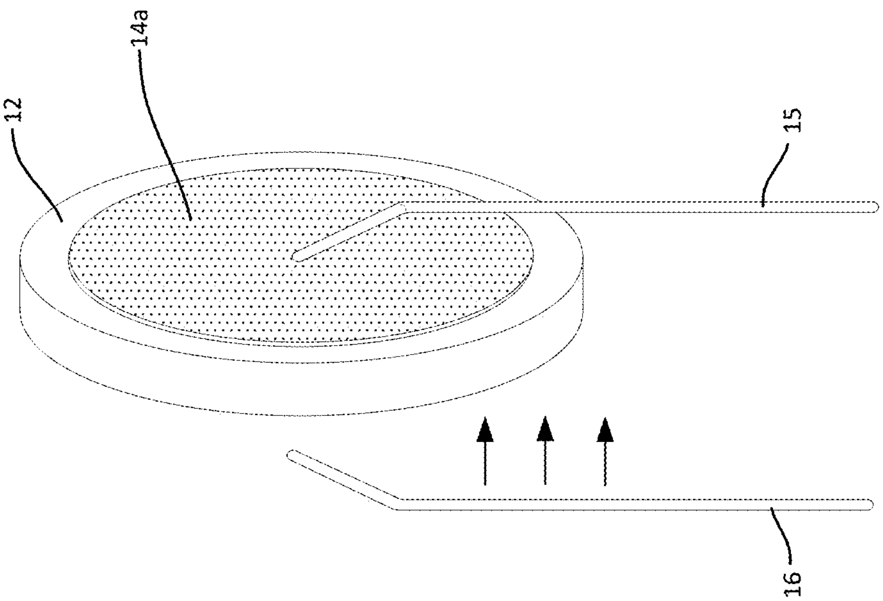

Referring to FIG. 2E, the electrically conductive first and second leads 15, 16 may be connected to the first and second electrodes 14*a*, 14*b*, respectively (the first lead 15 is shown connected to the first electrode 14*a*, and the second lead 16 is shown in the process of being connected to the second electrode 14*b*). In various non-limiting embodiments, the first and second leads 15, 16 may be electrically connected to the first and second electrodes 14*a*, 14*b* via soldering, welding, electrically conductive adhesive, etc. The present disclosure is not limited in this regard.

Referring to FIG. 2F, the dielectric polymer coating 20 may be applied to the MOV chip 12, the first and second electrodes 14*a*, 14*b*, and portions of the first and second leads 15, 16. The polymer coating 20 may protect the covered components of the MOV 10 from environmental elements and may prevent electrical shorting between the MOV 10 and surrounding circuit components. In various embodiments, the dielectric polymer coating 20 may be applied using a conventional dipping process. The present disclosure is not limited in this regard.

Those of ordinary skill in the art will appreciate that the above-described MOV 10 and associated method of manufacture provide numerous advantages. For example, the above-described MOV composition 22, which includes a polyaniline-polymer matrix, is far more robust and far less susceptible to cracking when subjected to abnormal overvoltage conditions relative to ceramic matrices used in conventional MOV chips. The risk of catastrophic failure (e.g., combustion) is therefore greatly mitigated relative to conventional MOV chips. Additionally, the MOV composition 22 can be formed into a MOV chip using a pressing process performed at low temperatures, avoiding the need for high-temperature sintering processes that are typically employed to form MOV chips from conventional MOV compositions (i.e., metal oxide granules embedded in a ceramic matrix). Still further, the robustness and breakdown voltage of the MOV chip 12 of the present disclosure can be easily tuned by varying the ratio of metal oxide and polyaniline-polymer in the MOV composition 22.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A metal oxide varistor (MOV) comprising:

a MOV chip;

a first electrode disposed on a first side of the MOV chip; and a second electrode disposed on a second side of the MOV chip;

electrically conductive first and second leads connected to the first electrode and the second electrode, respectively;

wherein the MOV chip is formed of a MOV composition comprising metal oxide granules embedded in a polyaniline-polymer matrix, wherein the metal oxide granules are zinc oxide granules and further comprising a dielectric polymer coating covering the MOV chip, the first and second electrodes, and portions of the first and second leads.

2. The MOV of claim 1, where the first electrode and the second electrode are formed of one of copper, copper alloy, aluminum, aluminum covered with copper, silver, tin, and nickel.

3. A metal oxide varistor (MOV) composition comprising metal oxide granules mixed with a polyaniline-polymer, wherein the metal oxide granules are zinc oxide granules.

4. A method of manufacturing a metal oxide varistor (MOV), the method comprising:

placing a quantity of a MOV composition in a pressing die, the MOV composition comprising metal oxide granules mixed with a polyaniline-polymer;

performing a pressing operation including operating the pressing die to compress the MOV composition into a solid MOV chip; and applying first and second electrodes to opposing first and second sides of the MOV chip, wherein the metal oxide granules are zinc oxide granules.

5. The method of claim 4, wherein the pressing operation is performed at a temperature in a range of 15 degrees Celsius to 200 degrees Celsius.

6. The method of claim 4, wherein the first and second electrode are applied to the MOV chip using one of a cold pressing process and a sputtering process.

7. The method of claim 4, further comprising applying electrically conductive first and second leads to the first and second electrodes, respectively.

8. The method of claim 4, further comprising covering the MOV chip, the first and second electrodes, and portions of the first and second leads with a dielectric polymer coating.

9. The method of claim 4, where the first and second electrodes are formed of one of copper, copper alloy, aluminum, aluminum covered with copper, silver, tin, and nickel.

* * * * *